Figure 1:
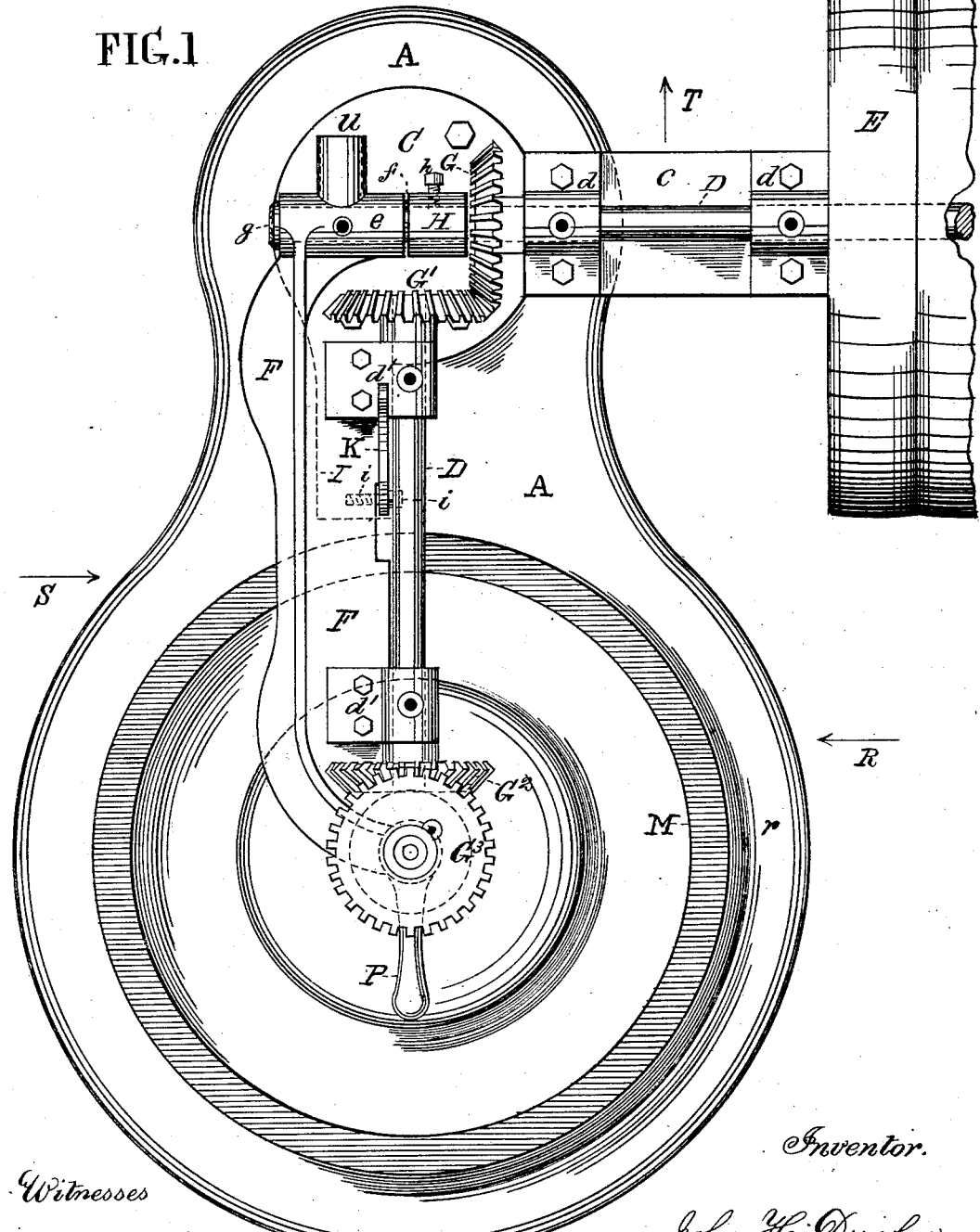

(No Model.) 3 Sheets—Sheet 1.

J. H. DUNBAR.
ICE CREAM FREEZER.

No. 317,446. Patented May 5, 1885.

Witnesses
Charles T. Madden
Edward Clement.

Inventor
John H. Dunbar
per Thomas J. Bewley, Atty.

N. PETERS, Photo-Lithographer, Washington, D. C.

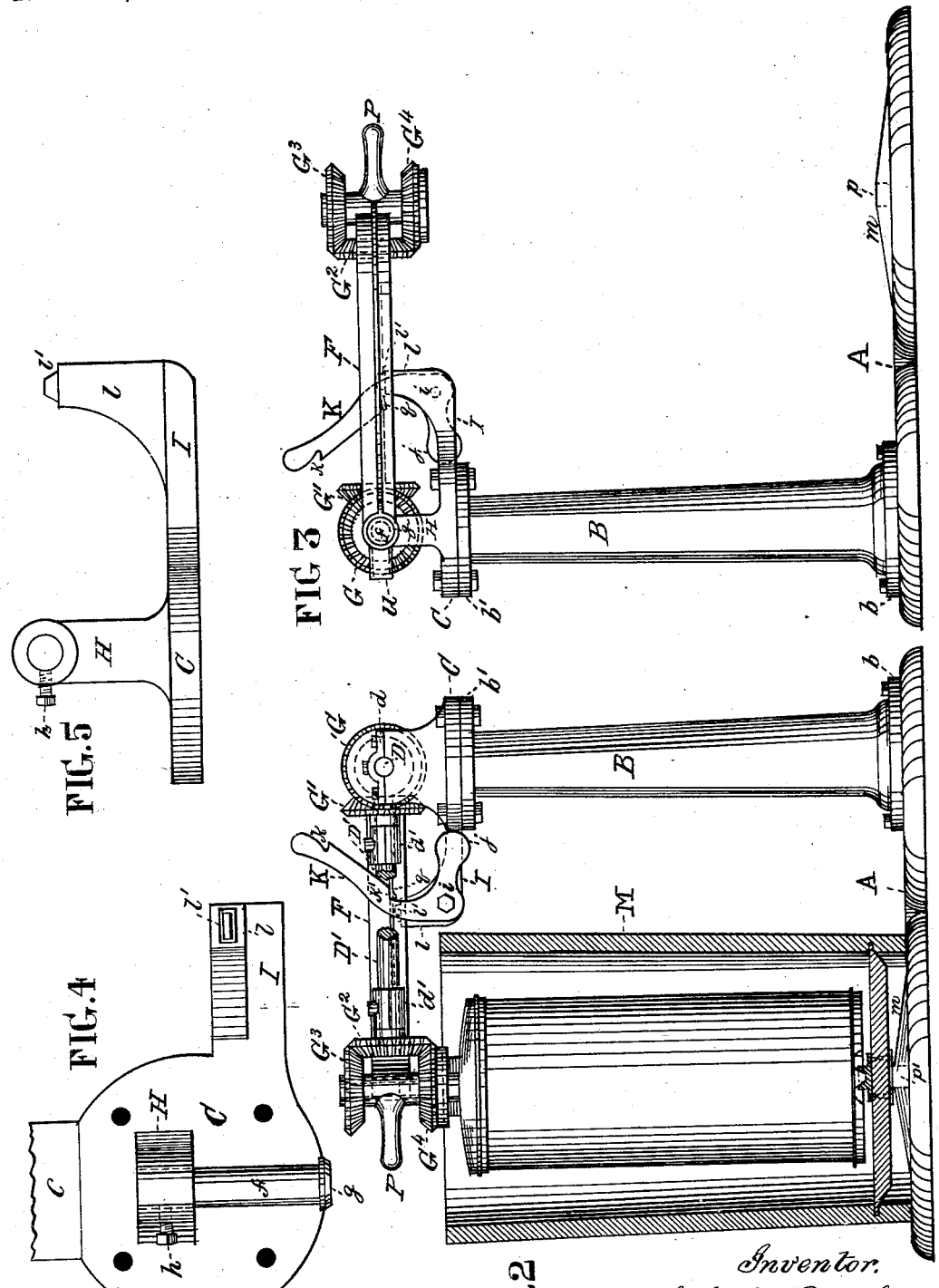

(No Model.)  J. H. DUNBAR.  3 Sheets—Sheet 3.
ICE CREAM FREEZER.
No. 317,446.  Patented May 5, 1885.
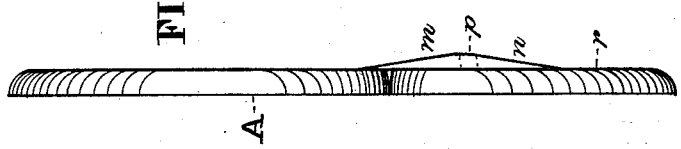
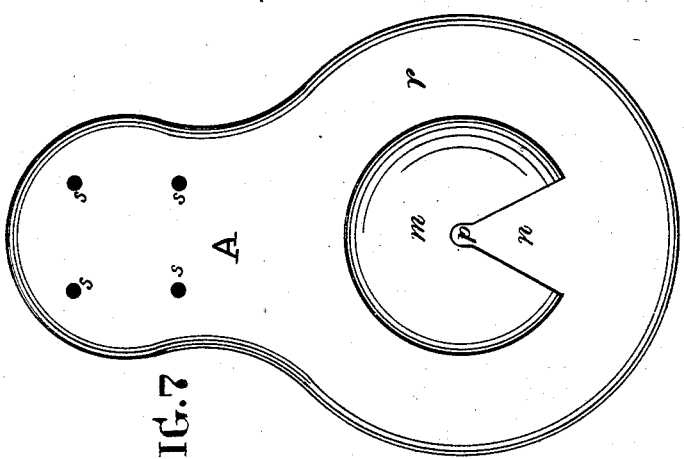
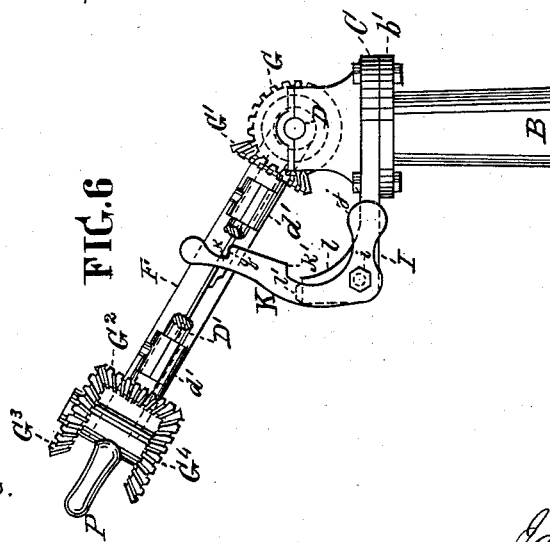
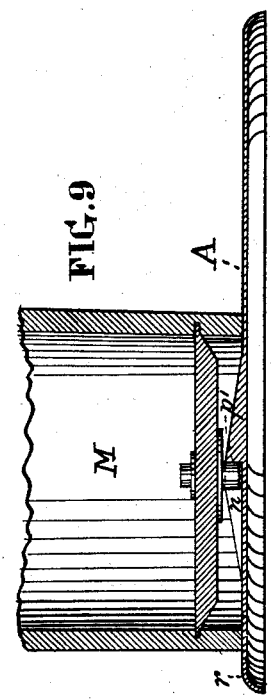
Witnesses.
Charles T. Madden.
Edward Clement.
Inventor.
John H. Dunbar.
per Thomas J. Bewley, Atty.

UNITED STATES PATENT OFFICE.

JOHN H. DUNBAR, OF PHILADELPHIA, PENNSYLVANIA, ASSIGNOR TO CLEMENT & DUNBAR, OF SAME PLACE.

ICE-CREAM FREEZER.

SPECIFICATION forming part of Letters Patent No. 317,446, dated May 5, 1885.

Application filed March 20, 1885. (No model.)

*To all whom it may concern:*

Be it known that I, JOHN H. DUNBAR, a citizen of the United States, residing at Philadelphia, in the county of Philadelphia and State of Pennsylvania, have invented certain new and useful Improvements in Ice-Cream Freezers, of which the following is a specification.

In ice-cream freezers heretofore manufactured that have been operated by rotary motion imparted to the can and beater through revolving shafts and a train of gear-wheels actuated by a belt and pulley or otherwise from motive power it has been obligatory to cease the motion and remove the gearing from its connection with the can when necessary to examine the cream or to remove the tub from position to place another to be operated upon. Another mode was to slightly elevate the gear-wheels from their connection with the end of the beater-shaft and turn them and the arbors upon which they revolved around at right angles to, or nearly so, with their line of motion, disconnecting the train. These methods of removing the operating-gearing from connection with the can are objectionable, involving much delay and trouble to accomplish the purpose.

The main object of my invention is such an arrangement of the mechanism by which the can and beater are rotated as will permit an expeditious attachment or detachment of the same to or from the can without the necessity of a cessation of the power, and also in the means used for locking said mechanism in its horizontal connected position with the can during its rotary movements, or retaining the counter-shaft and its bearing-frame in their inclined elevated position for the examination of the contents of the can or the removal of the tub from the base-plate, as hereinafter described.

Another object of my invention is so constructing the face of the base-plate upon which the tub containing the can rests with a centering device that it will always cause the tub to be placed and retained in position central with the line of motion of the propelling-power.

The invention consists, in the first place, of a pair of shafts or arbors arranged in suitable bearings, at right angles to each other, and whose centers are in the same horizontal plane (when connected and operating with the can and beater) and actuated in their revolutions by motive power communicated to them by a belt and pulley or a crank and fly-wheel attached to the outer end of the main or driving shaft of the pair, which imparts rotary motion to the counter-shaft or arbor from a pair of bevel-wheels permanently fastened upon the ends of the shafts to intersect and mesh at right angles to each other. The counter-shaft or arbor through which motion is in turn imparted to a train of bevel-gear meshing together at the forward end thereof (that rotate the can and beaters in opposite directions) has upon the frame to which its bearings are attached a supplemental bearing pivoted upon a pin extending through said bearing from a stud that projects upward from the face of the cap-plate that is bolted to a flange of the pillar that supports the operating mechanism. This pillar or column has a flange upon its lower end, which is connected to a base-plate by means of bolts, serving as a platform for carrying the shafts, gearing, and connections. Extended from the cap-plate, and in parallel lines with the counter-shaft, is an arm, to which is connected a weighted lever by means of a bolt, permitting free movement thereon, the upper end of the lever extending in a slot of a rib of the frame, between it and the counter-shaft, for convenience in handling, and to provide material to form a support in a notch cut in one edge for the frame and its shaft to rest upon when elevated from their horizontal position. This lever serves the double purpose of locking the frame carrying the counter-shaft securely upon said arm in its horizontal position when motion is to be imparted to the can, and of holding said frame in an elevated position from the same when the tub and contents are to be removed or examined, the lever being weighted to cause it to always fall into its proper notch for locking the frame or holding and supporting the same in its elevated position. Upon the upper face of the arm above described is a projection that has a boss upon its end of any desired shape, that fits into and engages with an opening of corresponding shape in the under surface of the frame, in such a manner that when the parts are locked together by the lever the boss prevents any lateral motion or vibration of the frame and shaft. The upper surface of the base-plate has cast upon it a circular, slightly-conical projection having an opening in its front leading to a central orifice, with which a boss on the bottom of the tub is caused to engage, to center it and the end of the beater-shaft in a perpendicular line for the reception of the operating-gearing. This projection is of such diameter as will permit of the different sizes of tubs resting firmly outside of it upon the base-plate, as hereinafter more fully described.

In the accompanying drawings, which make a part of this specification, Figure 1 is a plan view of my improved ice-cream freezer. Fig. 2 is a side elevation of the same, viewed from the direction of the arrow R, Fig. 1. Fig. 3 is a like view from the direction of the arrow S, Fig. 1. Figs. 4 and 5 are a plan view and side elevation of the cap-plate C and stud H. Fig. 6 is a side elevation of the machine, showing the counter-shaft D' and its bearing-frame F held in their elevated position by the lever K. Figs. 7 and 8 are a face and side views of the base-plate A. Fig. 9 is a vertical sectional view of the base-plate A and the lower portion of a tub, M, showing the connection of the boss or stud $p'$ with the orifice $p$.

Like letters of reference in all the figures indicate the same parts.

A is the cast-iron base-plate, and B the column or pillar bolted thereto through the flange $b$. Upon the upper end of the column, to the flange $b'$, the cap-plate C is bolted. To the extension $c$ of this cap-plate is connected the driving-shaft D in the bearings $d\ d$, which is caused to revolve in the direction of the arrow T (seen in Fig. 1) by motion imparted from a belt passing over the pulley E, communicating with the motive power, or by means of a crank and fly-wheel.

D' is a counter-shaft or arbor, which revolves in the bearings $d'\ d'$ of the frame F. Motion is imparted to this arbor from the driving-shaft by the meshing of the bevel-wheels G G' upon the ends of the shafts D D', the ends of which extend through only and hold the wheels rigidly thereon. This shaft D' has upon the opposite end to which the wheel G' is attached the bevel-wheel $G^2$, which meshes into the bevel-wheels $G^3\ G^4$, that impart opposite rotary motions to the can and beater. As this connection of gearing with the can and beater is not new, a detailed description thereof is not necessary to be given.

At the rear end of the frame F, in line and central with the driving-shaft D, is the bearing $e$, connected by a slip-pin, $f$, to the stud H, that is projected vertically from the upper surface of the cap-plate C. This pin has a head, $g$, on its outer end, and is held firmly to act as a journal in the stud H by the set-screw $h$. The hollow sleeve U, formed on the rear surface of the bearing $e$ at right angles thereto, is for the reception of a counter-weight, to assist in balancing the frame F when raised or lowered. The cap-plate C has an arm, I, parallel with and beneath the frame F, to which is pivoted at one side the locking and supporting lever K by means of the bolt $i$. This lever is seen clearly in Figs. 2, 3, and 6. It is provided with the weighted end $j$, and has notches $k\ k'$ in its forward edge, the lower one of which rests upon the upper edge of the lip $q$, locking the frame F down firmly in position for revolving the can through the train of gear-wheels. The upper notch serves as a support for the frame when it is elevated to remove the gearing from connection with the can and beater-shaft. The lever automatically, by reason of its weighted end falling forward, causes either notch $k\ k'$ to engage with the lip $q$, as may be desired, to lock or support the frame. The arm I has upon its end a stud, $l$, on the top of which is a tongue, $l'$, (seen clearly in the detail views 4 and 5,) which fits into a corresponding opening in the under side of the frame F when the latter is locked down, to assist in holding the parts rigidly together and prevent lateral vibration.

The base-plate A, detailed views of which are shown in Figs. 7, 8, and 9, has holes $s$, for the reception of bolts, which pass through corresponding holes in the flange $b$ of the pillar B, and confine the same thereto.

Upon the front $r$ of the base is the elevation $m$, slightly conical in shape, provided with the passage $n$, leading from its circumference to the central orifice, $p$. This passage $n$ is of dovetail or fan shape from the circumference of the elevation to said orifice, and forms a guide by means of which the boss $p'$, which extends from the bottom of the tub M, shall insure the seating of said boss when the tub is slid into position, as seen clearly in the sectional view, Fig. 9. The elevation $m$ on the plate is made slightly conical in shape, in order that when a tub is to be placed in position the chine may easily be slid over it without the necessity of lifting the tub, and is of such diameter as to permit the use of different sizes of tubs.

The mode of operating my freezer is as follows: The tub containing the can, its contents, and the beater, being packed with the freezing-mixture, is rolled upon the base-plate A and slid over the elevation $m$, the passage $n$ acting as a guide for the boss $p'$ of the tub until it centers and is seated within the orifice $p$, the tub being now central in the vertical line of motion with the power to be imparted. The operator then takes hold of the handle P, attached to the forward end of the frame F, (the frame, shafts, and gearing being in the position seen in Fig. 6,) slightly raising the forward end of the frame, and disengages the lever K, drawing it forward to sever its connection with the lip $q$. He then lowers the frame until it assumes a horizontal position and the gearing $G^2\ G^3\ G^4$ is in connection with the can and beater-shaft, as seen in Fig. 3. The lever K then falls forward, with its lower notch, $k'$, engaging with the upper face of the lip $q$, which securely locks it; at the same time the tongue $l'$ of the stud $l$ enters a corresponding opening in the under side of the frame, assisting in securing the parts, and preventing any lateral vibration of the operating mechanism.

When it is desired to examine the contents of the can or to remove the tub from its connection with the base-plate, the lever K is drawn forward sufficiently to disengage the notch $k'$ from its connection on the upper face of the lip $q$, the operator then raising the forward end of the frame by the handle P, to permit the notch $k$ of the lever to engage with the under side of the lip $q$, supporting the frame, counter-shaft, and gearing in their elevated position removed from connection with the can. In this operation, by the pivotal movement of the frame upon the bearing $e$ of the pin $f$, held by the stud H and the bevel-wheels G G′ on the shafts D D′, meshing together at right angles to each other, it is not necessary to stop the motive power to examine the contents of a can or to remove a tub.

The motion of the gear-wheel G′ in raising or lowering the forward end of the frame F being similar to the revolution of the circumference of one wheel around that of another, they must necessarily always mesh together and impart and continue the rotary motion.

What I claim as my invention, and desire to secure by Letters Patent, is—

1. The weighted locking and supporting lever K, having the notches $k\,k'$ upon its edge, substantially as shown and described, for the purpose set forth.

2. In an ice-cream freezer, the arbors D D′, having upon their contiguous ends the bevel gear-wheels G G′ at right angles to each other, with their centers in the same horizontal plane, for imparting rotary motion through the train of gear-wheels $G^2\,G^3\,G^4$ to the can and beater, substantially as described.

3. The frame F, carrying the counter-shaft D′, and bevel-wheel G′, and bearing $e$, in combination with the pin $f$ and stud H of the cap-plate C, whereby the said frame may be raised or lowered upon its pivotal point during the revolutions of the shafts carrying the motive power, substantially as described.

4. The base-plate A, having the conical projection $m$, provided with the fan-shaped passage $n$ and central orifice, $p$, substantially as and for the purpose shown and described.

5. The base-plate A, constructed as shown and described, in combination with the boss or stud $p'$ of the bottom of the tub of an ice-cream freezer, for the purpose set forth.

6. The cap-plate C, provided with the extension $c$, carrying the shaft D, arm I, having the stud $l$ and tongue $l'$, and the pivoted weighted lever K, the stud H, with the pin $f$, in combination with the frame F, carrying the counter-shaft D′, whereby said parts may be firmly locked for operating the can and beaters of an ice-cream freezer, or held in an elevated position to permit examination of the cream or the removal of a tub, by the notches $k\,k'$ of the lever engaging with the lip $q$ of the rib of the frame F, substantially as shown and described.

JOHN H. DUNBAR.

Witnesses:
THOMAS J. BEWLEY,
EDWARD CLEMENT.